Oct. 27, 1942.  C. R. JOHNSON ET AL  2,300,290
MOLDING MACHINE
Filed Aug. 25, 1939  6 Sheets-Sheet 3
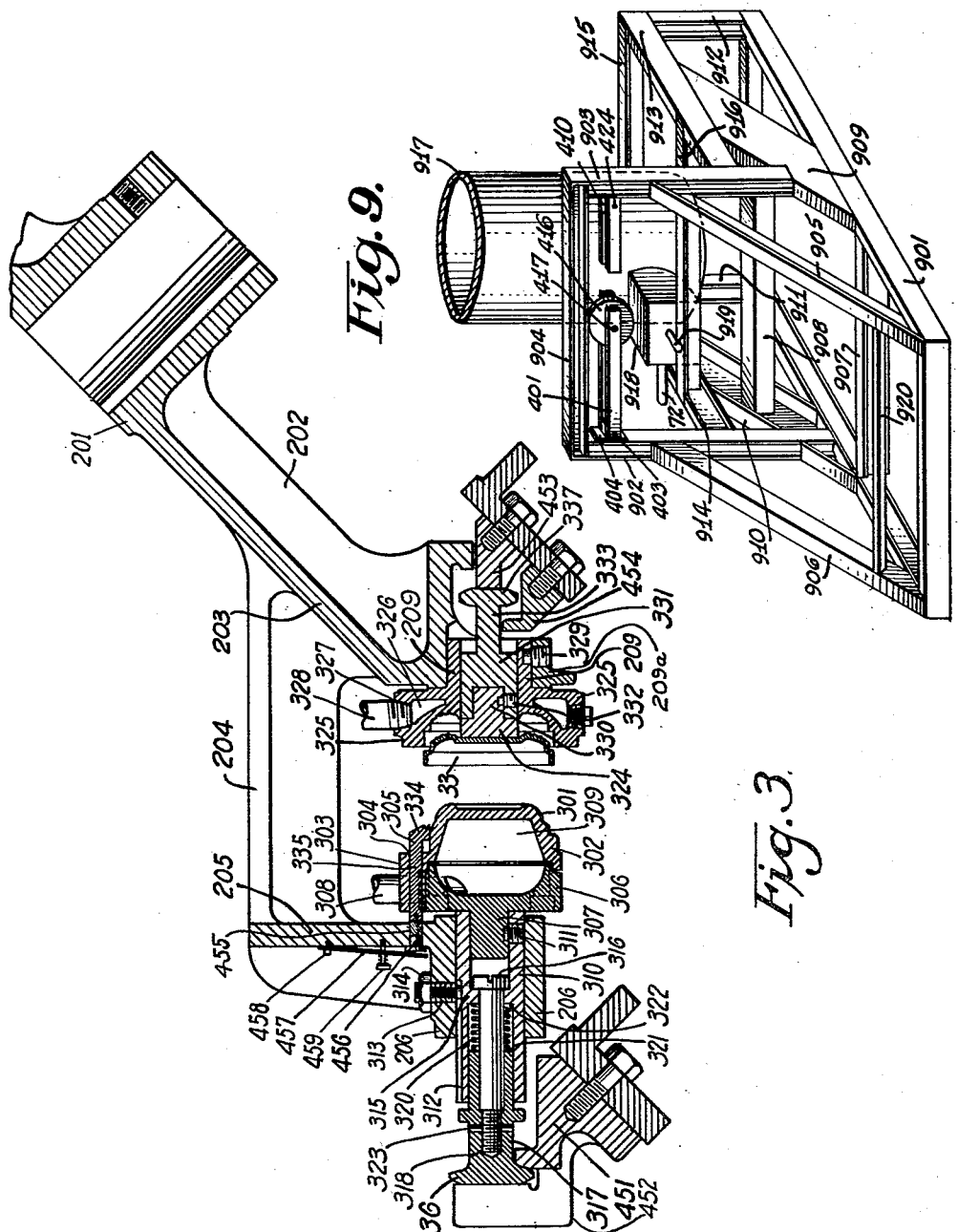
Charles R. Johnson
Stanley L. Handforth  INVENTORS
Royal E. Smith
BY
ATTORNEYS Oct. 27, 1942.   C. R. JOHNSON ET AL   2,300,290
MOLDING MACHINE
Filed Aug. 25, 1939   6 Sheets-Sheet 4

Charles R. Johnson
Stanley L. Handforth
Royal E. Smith   INVENTORS

BY
ATTORNEYS

Charles R. Johnson
Stanley L. Handforth   INVENTORS
Royal E. Smith

Oct. 27, 1942.　　C. R. JOHNSON ET AL　　2,300,290
MOLDING MACHINE
Filed Aug. 25, 1939　　6 Sheets-Sheet 6

Charles R. Johnson
Stanley L. Handforth
Royal E. Smith
INVENTORS

Patented Oct. 27, 1942

2,300,290

UNITED STATES PATENT OFFICE 2,300,290

MOLDING MACHINE

Charles R. Johnson, Glen Mills, Pa., and Stanley L. Handforth and Royal E. Smith, Wilmington, Del., assignors to Remington Arms Company, Inc., a corporation of Delaware Application August 25, 1939, Serial No. 291,886

19 Claims. (Cl. 18—20)

This invention relates to machines for molding thermoplastic material. It especially appertains to the manufacture of the flying targets (commonly called "clay pigeons") employed in trap shooting. More particularly it relates to an apparatus embodying a series of dies for the manufacture of molded articles which are produced by compressing a hot fluid material in a die, and maintaining such a condition until the fluid material has solidified by cooling. It is to be understood, however, that it is not limited to molding of targets and is of general application.

A target of the type mentioned comprises a circular dished body that is of sufficient strength to withstand the action of a catapult (trap) in throwing it into the air and yet is readily frangible when struck by gun shot. Such targets are formed of a thermoplastic material, usually a mixture of pitch and one or more inert fillers such as powdered limestone (clay, plaster). The pitch or other bituminous material ordinarily comprises 40% to 60% of the mixture, and the filler the remainder. The mix is usually one which flows fairly readily (that is, has the consistency of heavy molasses) at temperatures in the neighborhood of 300° F. (149° C.).

Although the manufacture of such targets has long been known, the art has not yet developed satisfactory automatic machines for their molding. At present most of the targets are manufactured by hand presses or by manually operated hand controlled power presses (for example, the devices of United States Patents 422,655, 1,238,980 and 2,064,624).

The invention has for an object the molding of thermoplastic articles with great rapidity and high uniformity. Other objects are the design of an automatic molding machine for bird targets, the elimination of flash and scrap from female molds, the simplification of means and methods for removing targets from molds, the provision of an improved die cooling system, and the design of an improved mechanical pressure applicator for dies in motion, particularly angularly mounted dies. A general advance in the art and other objects which will appear hereinafter are also contemplated.

From the following description, in which is disclosed certain embodiments of the invention as well as details of what is believed to be the best mode for carrying out the invention, it will be apparent how the foregoing objects and related ends are accomplished. The written description is amplified by the accompanying drawings which show a machine embodying the invention, and in which:

Fig. 3 is a sectional view of a die and a portion of the die table which supports it;

Fig. 9 is an isometric diagrammatic view of part of the machine frame, the molding composition reservoir and the feed pump;

Fig. 10 is a sectional plan view of the cooling water manifold;

Similar characters refer to similar parts throughout the drawings.

Figure 1:
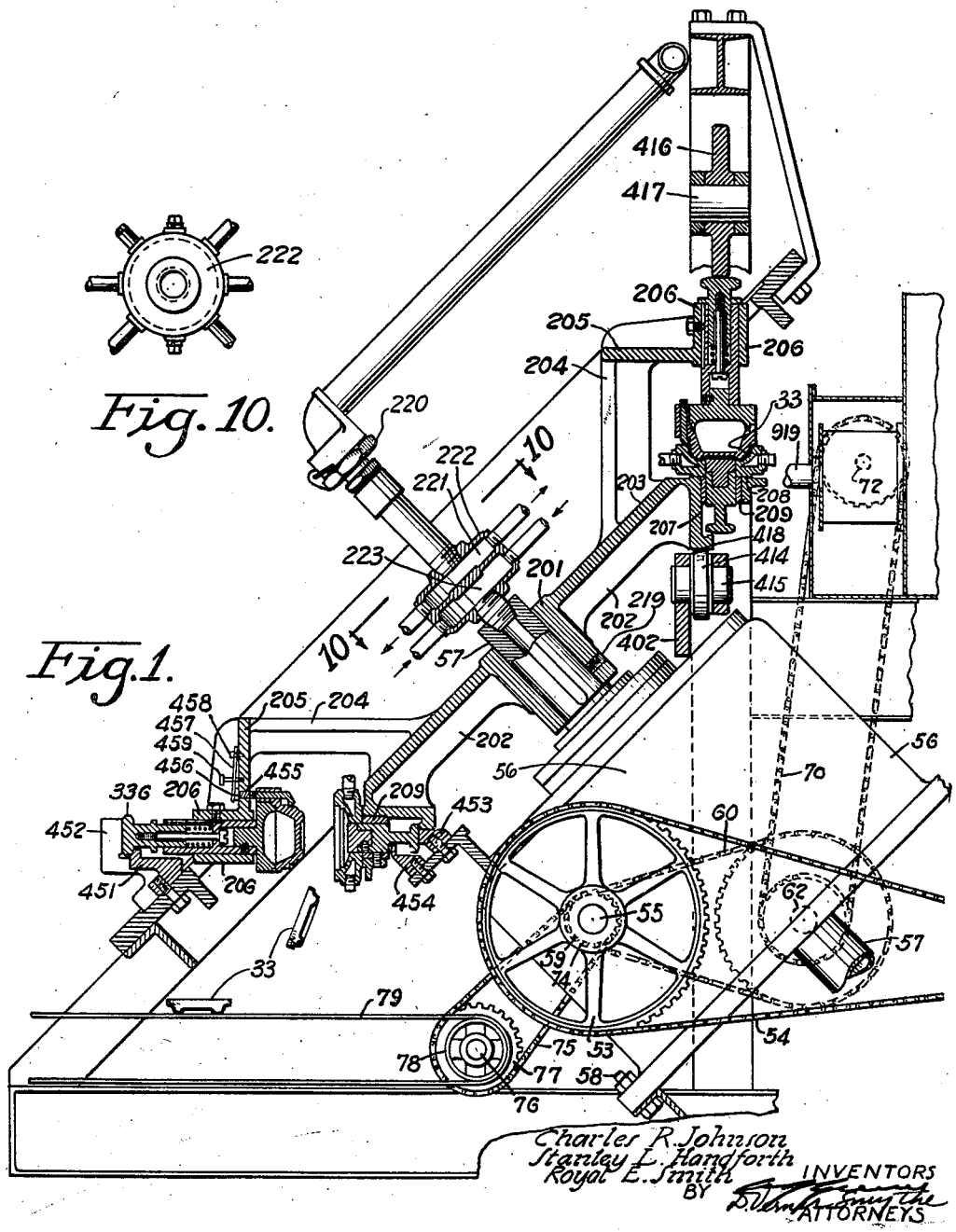
Fig. 1 is a side elevation partly in section of the major portion of the machine.

First a general description will be given, following which will be found a detailed description of a machine embodying the invention. In general, the machine comprises a rotating carrier upon which are mounted a series of two-part dies. The surface on which the dies are mounted is a truncated cone, the axis of which is inclined so that the dies at the top surface are substantially horizontal and the dies at the lower part will be substantially vertical. Generally the plastic mixture is placed in a tank and is kept at a sufficiently high temperature so that it will feed properly. A metering pump or similar device takes the mixture therefrom and causes it to fall onto the female die. As stated, the two-part dies are mounted on the outside face of the rotating carrier which is in the form of a truncated cone. The feeding to the dies takes place at a point where the dies which are passing therebeneath are substantially horizontal. A set of stationary cams have cooperated with stems on the dies so as to move the male die away from the female die at this point so that the feeding spout or other means is in a position to feed the mixture onto the female die. The cams then close the male die onto the female die as the rotating carrier is rotated. The two-part dies then pass between two opposed rollers, a lower roller supporting the female die and an upper roller pressing on the male die. The rollers are each mounted on a pivoted arm and there is a tensioning or spring means at a point remote from the pivots, the rollers being mounted between this latter point and the pivots. The dies, by their passage through the two rollers, further compress and properly mold the plastic material. A supply of cooling fluid is fed to cooling chambers on either side or integral with each of the parts of the dies so that as the dies continue in their rotation the cooling fluid will cool the plastic material and cause it to set. As the carrier rotates further, a point will finally be reached which is approximately 180° from the point at which the material was fed to the dies, at which time the dies will be substantially vertical. Just previous to this, another stationary cam actuates the male die to separate it from the female die, and an ejector or suitable plunger that is integral with the female die is operated by a suitable cam to remove the molded target therefrom, the molded target having set sufficiently so that it can be removed. In the event that the target sticks to the male die, a suitable stripper means is provided to force the target off the male die so that in either event it will be removed from the dies. The target falls onto a conveyor which is operated by the main driving motor and is carried from the machine.

In the embodiment shown in the drawings, the table carries 24 dies and rotates on a shaft whose axis is inclined at 45° to the vertical. The molds are mounted at a 45° angle with the plane of rotation of the table. The number of dies and precise angle of inclination is not exact and may be varied. As a result, the axis of each die is substantially vertical when the die is at its highest point of rotation, and is horizontal when the die is at the lowest point during its rotation.

The feed pump supplies the fluid molding composition to the dies when the axis is substantially vertical, and gravity and/or ejecting mechanisms remove the partially cooled target, the targets being usually too hot to handle when ejected, from the die when its axis is about horizontal. Suitable conveying means receive the target as it drops from the die and immediately convey it through sprays (not shown) of water, for additional cooling, to other locations for painting and packing.

*The carrier*

The rotating carrier or table resembles in general appearance a miter gear. It has an annular rim and overhanging flange supported by spokes and ribs. The series of target dies is mounted upon the rim and flange, the dies proper being between the two. A stem on each male die is secured in the flange, and a stem on the corresponding female die is secured in the rim. As a result, the female die opens upwardly at its topmost position during the rotation of the table, and opens horizontally at the lowest point in its rotation. This enables the die to retain the molding composition by means of gravity when it is in a fluid state, and to discharge the molded target by means of gravity when the molding operation is finished.

In the drawings the rotating carrier is shown in section in Fig. 1. It comprises a central hub 201 which is secured by set screw-like devices 219 to the shaft 57, said shaft extending upwardly from the worm gear unit housing 56, and spoke reinforcing ribs 202 extending from the said hub and strengthening the main carrier portion 203. Extending upwardly from the main table surface 203 are reinforcing arms or ribs 204 which support an annular flange 205. It can be seen that the surface of 205 is in the form of a truncated cone whose axis lies substantially in the center of a prolongation of shaft 5. This annular flange has a series of journal-like bosses 206 at regular intervals, which serve as cylinders or bearings in which the stem portion of the male dies reciprocate in their motion to and from the female dies. The main table surface along its annular rim 207 also has bosses 208 which receive the base or stem portion 209 of the female die.

*The driving mechanism*

In the embodiment of the invention being described, the power is applied to a main or input shaft and all the moving parts of the machine are driven therefrom by chain and sprocket drives. Other types of operators such as separate motor drives, belt drives, and other power transmitting means such as angularly placed shafts and miter gears are within the purview of the invention.

Figure 2:
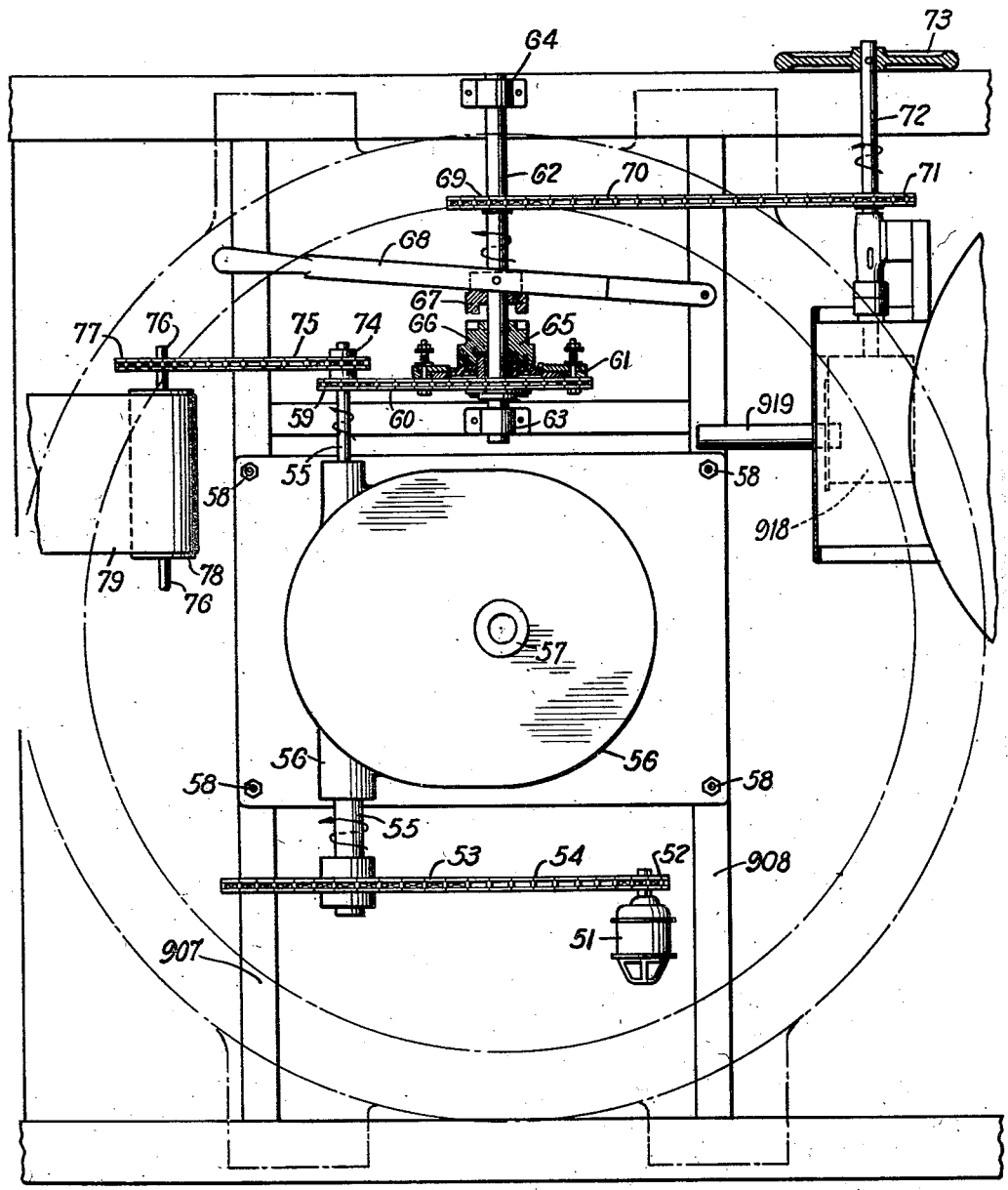
Fig. 2 is a plan view (from below the molding table) showing the various drives and power supplying elements of the machine.

As shown in Fig. 2, a motor 51, through a sprocket 52 on its rotor shaft and a sprocket 53 on the input shaft 55 furnishes, through a chain 54, the driving power for the apparatus. The input shaft extends through the housing 56 of a worm gear unit. The input shaft carries the worm inside this housing, and the worm gear which meshes therewith is fixed to the hollow table shaft 57 which protrudes from the top and bottom of the said worm gear unit housing. Shaft 57 through keys and key-ways of conventional design, turns the rotating carrier carrying the dies. The housing 56 is extended or flared at its bottom to furnish supporting means for the unit, and through this extended portion pass bolts 58 for the purpose of securing the gear unit to the frame of the machine. The place of attachment to the machine frame is on the cross-arms 907 and 908.

A sprocket 59 on the extended portion of the shaft 55 drives a chain 60 which in turn drives the driven portion of a friction clutch indicated generally at 61 on the intermediate clutch shaft 62 journaled in the bearings 63 and 64 mounted on the machine frame. The frictionally connected portion 65 of the conventional friction clutch 61 carries one portion 66 of a positive jaw clutch comprising parts 66 and 67. The part 67 which is moved in and out of operative engagement with the driven portion 66 by means of a lever 68, is mounted to drive the intermediate clutch shaft 62. A sprocket 69 on the intermediate clutch shaft drives the chain 70, which in turn drives the sprocket 71 on the molding composition feed pump shaft 72. The feed pump shaft 72 also carries a hand wheel 73 which is utilized in starting the said feed pump.

The input shaft on its extended portion also carries a sprocket 74 which operates conveyor 79, through chain 75, conveyor belt roller shaft 76, and sprocket 77. The shaft 76 carries a roller 78 over which the conveyor belt 79 passes. The conveyor belt removes the finished targets from the machine.

The positive jaw clutch comprising parts 66 and 67 is utilized to permit operation of the rotating table without operation of the feed pump. The inertia of the feed pump is considerable, and the previously mentioned hand wheel 73 enables the operator of the machine to set it in motion before engaging the aforesaid clutch parts 66 and 67. By this design, driving parts of considerably less strength and bulk can be used in the machine.

The molding composition used for the so-called "clay pigeon" targets comprises materials that might contain extraneous bodies such as bits of metal, stone and the like with sufficient frequency to necessitate the use of a friction clutch 61 in the feed pump driving line. The said extraneous bodies possess sufficient rigidity and bulk to stop the feed pump as they enter it, and in the absence of a friction clutch many of the driving parts would be torn up or broken by such a sudden positive stoppage. A screen in the lower part of the reservoir does much to prevent such occurrences. A variable speed device may be interposed between the parts 55 and 61 if desired. In such a case suitable intermediate connecting drives may be used.

A variable drive when used in the line allows an easy and simple regulation of the amount of fluid composition entering the dies.

The frame

In general, the manner of supporting the operative parts of the machine is not particularly significant, as it is only necessary to provide a framework of sufficient ruggedness and rigidity and, obviously, many different forms of framework will meet the requirements.

One very satisfactory embodiment is shown in Fig. 9. It is built of standard structural shapes such as conventional I, H and channel beams. There is a rectangular base frame 901 made up of channel beams of standard dimensions. Mounted on the long sides of the base and extending at right angles upwardly therefrom is a centrally located inverted U shaped unit or portion indicated by the numbers 902, 903 and 904. The uprights 902 and 903 and cross piece 904 are I-beams of standard section. Angularly placed bracing channel beams 905 and 906 connecting the base and the uprights furnish support for various parts of the machine, particularly the cams. The worm gear unit 56 is mounted on a cross beam 907 extending across the base and another cross beam 908 extending in the same direction, the upper of these beams being secured to the angularly placed channel members 909 and 910 and the lower extending across the frame base. Uprights 911 and 912, together with 902 and 903, support an upper frame whose sides and end are indicated by the numerals 913, 914 and 915, respectively. The upper frame has an intermediate cross piece 916. The upper frame supports the reservoir for the molding composition and in turn the pump attached thereto. Since the tank is generally of considerable dimensions for commercial practice, it is sometimes desirable to provide a strengthening frame around its exterior. Such a frame, which may be of any desired design, has not been shown in the drawings for the sake of clearness.

The molding composition tank is shown diagrammatically at 917, and the pump for the fluid molding composition at 918. Shaft 72 (Figs. 2 and 9) is the driving shaft to which reference was previously made. The pump forces the molding composition from the storage reservoir (to which it is connected) through the spout 919 into the path of the dies in a continuous stream. It will be understood that the framework for the machine may be riveted or welded in accordance with the desire of the constructor. In order to show the relation of the rotating table to the framework, the upper cross arm 401 and the pressure roller 416 are also depicted in Fig. 9. The support 404, as stated elsewhere, is bolted to the frame piece 902. The opposite end of the arm 431 is slidably secured as described elsewhere. The cross arm 920, extending between the members 905 and 906, supports part of the cam mechanism.

The dies

In the preferred embodiment of the invention there are 24 dies on the table. These are numbered from 1 through 24 in Figs. 4 and 5. For convenience the same numbers also designate positions of the dies in their path of rotation (see Figs. 7 and 8). Each individual die assembly comprises separable male and female dies. Back of the molding surface in each die is a cooling water chamber, and each die has, opposite the molding surface, a cylindrical shaft-like stem portion by which it is secured to the rotating table. The main portion of the female die is fixed in position on the rotating table. The central portion of the female die is movable, sliding in the aforementioned shaft-like portion of the female die. This arrangement enables a portion of the molding surface to act as an ejector for the molded object. The male die is reciprocated to and from the female die by means of its supporting shaft, which slides in a boss on the flange on the rotating table.

An individual die assembly is shown in detail in Fig. 3. 301 represents the male die molding surface, preferably made of phosphor bronze, which is the outside surface of a bowl-shaped piece 302. Integral therewith is a projecting arm 303 drilled at 304 to accommodate a plunger rod 305, described elsewhere. The piece 302 fits over a somewhat similarly shaped male die block 306 which has a centrally located projecting arm 307. The piece 306 is drilled and threaded to receive cooling water supplying and discharging lines, one of which is shown at 308. Water is thereby supplied to the chamber 309 formed on the inside of the male die when the parts 302 and 306 are secured together. As the incoming and outgoing water streams are directed somewhat tangentially to the circular water cavity, adequate circulation in the cooling chamber is obtained. The previously mentioned stub shaft 307 is securely fixed to a pressure spindle sleeve 310 by means of a set screw 311. The pressure spindle sleeve has a slotted keyway or guide 312 in which the projecting point of a screw 313, having a locknut 314, slides, said screw 313 maintaining the pressure spindle sleeve and the attached male die in position in the boss or hub 206. The pressure spindle sleeve has a drilled central partition indicated at 315, through which a pressure spindle bolt 316 extends. This bolt is threaded into the pressure spindle 317, as indicated at 318. Surrounding the pressure spindle bolt is a spring 320 which, by pressing against the base of the pressure spindle at 321 and the partition 315 at 322, tends to force the pressure spindle to its outermost position which is limited by the pressure spindle bolt. This bolt, because of its threads, initially positions the pressure spindle. Pin 323, extending through the pressure spindle bolt and the pressure spindle, maintains them in fixed position.

The female die molding surface comprises two parts, a central movable piece 324 and a fixed piece 325 surrounding the same. In the position shown in Fig. 3, the piece 324 is pushing a target 33 away from the part 325. The fixed piece, comprising the major portion of the female die, is centrally bored to receive the plunger-like ejecting plunger face 324. Ordinarily the piece 325 is a casting having a hollow portion 326 surrounding the central portion. The cavity 326 is the water cooling chamber, and there are drilled and threaded holes into the same through which the circulating cooling water enters and leaves, one of these being indicated at 327, part of one of the two water conduits being shown in position at 328. For convenience in manufacture, four openings are made to the cooling water chamber, and two of these are later plugged, as shown in Fig. 3. The portion 325 is secured to the boss 209A on the rotating table by means of a set screw 329. The central portion of the female die, hereinbefore referred to as the ejecting plunger face 324, has a backing portion 330 of reduced diameter, fitting inside of the ejecting plunger 331 and secured thereto by means of a set screw 332. On the opposite end of the ejecting plunger from the ejecting plunger face there is a knob-like portion 333 which connects or cooperates with various cams during the rotation of the rotating table.

If the molded target should tend to stick to the female die, the ejecting plunger, being actuated by appropriate cams elsewhere described, forces the molded product out of the die.

In case the molded target tends to stick to the male portion of the die, it is forced free by means of a stripper finger 334, which is a separable or movable part of the male die and constitutes a segment of the molding surface. The separate portion has a supporting shaft 335 which slides in the drilled portion 304 of the projecting arm 303 previously described. The ejecting finger travels with the male die to and from the molding position. Located in the web 205, which supports the boss 206, is a slidable clevis pin 456 held in position by a leaf spring 457, said pin coacting with the end of the stripping finger shaft 335 to strip any molded piece which might stick to the surface 301.

Molding pressure applicator

As indicated elsewhere, the molding composition, flowing from the feed pipe in a continuous stream, is run onto the female die when the male die is raised therefrom. Thereafter the male die descends, cutting off the stream of molding composition extending across the female die, and the two dies are forced together by positive pressure sufficient to mold the target composition.

Figure 6:
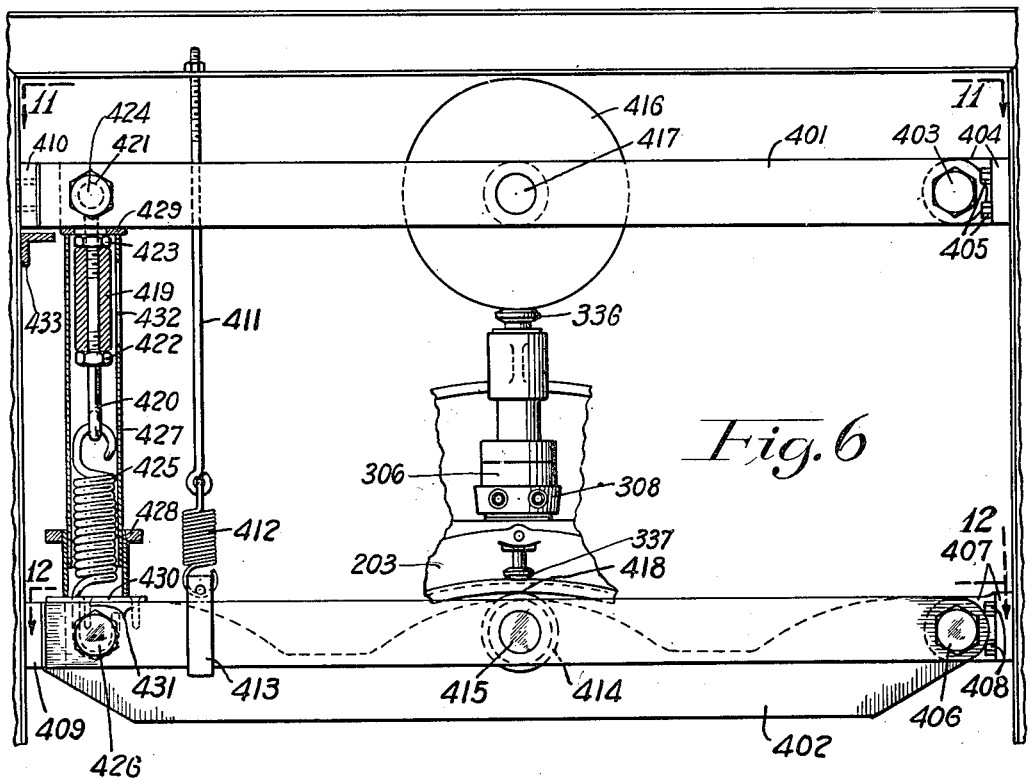
Fig. 6 is a back elevation view of that portion of the apparatus which comprises the molding pressure applicator (the arrangement used to compress thermoplastic material in the dies)
Figure 11:
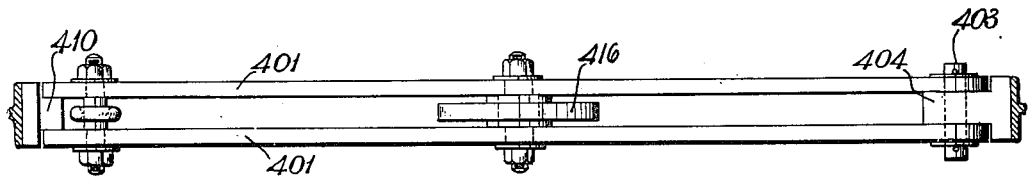
Fig. 11 is a plan view of the top arm of the molding pressure applicator.
Figure 12:
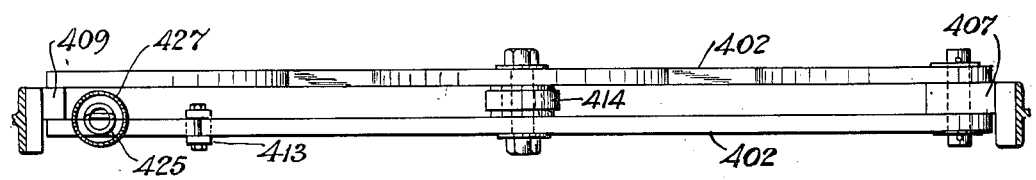
Fig. 12 is a plan view of the bottom arm of the molding pressure applicator.

A cam forces the male die down toward the female die, positioning the parts of the mold for the closing operation. The operation of closing the mold whereby the stream of molding composition is cut and the target molded, is accomplished by a portion of the machine for convenience called the molding pressure applicator (Fig. 6). It comprises an upper pressure arm 401 and a lower pressure arm 402 pivoted or hinged on one of the side uprights of the machine frame. Both arms comprise two rigid bars between which rollers exerting the molding pressure are journaled. The front bar of the lower arm is specially shaped to permit movement of the rotating table. The upper pressure arm hinges about a bolt 403, fastening through an eye in an upper pressure arm bearing 404 in turn, secured by means of bolts 405 to the said upright of the machine frame. The lower pressure arm is similarly pivoted about a bolt 406 which secures it to the lower pressure arm bearing 407, which bearing is secured by means of bolts 408 to the upright of the machine frame. On the opposite side of the frame a stop or bracket 410 forms a support for the upper pressure arm, an angle iron section 433 forming a shelf to support the upper pressure arm in its lowest position and to limit its downward movement. A centering guide or bracket 409 extends between the two bars making up the lower pressure arm, and is a T-shaped piece of metal with the shank between the arm parts and the top secured to the machine frame, preventing sidewise motion of the lower pressure arm. An eye bolt 411 secured to the top of the machine frame is connected by means of the tension spring 412 to a U-shaped strap 413 for normally maintaining the lower pressure arm 402 in operative position. The stops 409 and 410 extend between the ends of the two strips which make up the pressure arms and prevent extensive lateral movement. The application of downward pressure on the lower pressure on the lower pressure arm forces the same downward. The bracket 409 serves as a guide during this downward movement, which, as, will be apparent, causes a tension in the spring 412. The upper pressure arm forces the same downward. The upper pressure arm may rest on its sustaining bracket 433, but it is raised therefrom by pressure caused by a mold passing between the two pressure arms. The lower pressure arm 402 has centrally mounted thereon a shaft 415 upon which a lower pressure roll 414 is mounted. The upper pressure arm, similarly, has a centrally located pressure roll 416 mounted on a pressure wheel shaft 417, which, similarly to the shaft 415, is journaled in the pressure arm. The rolls 414 and 416 are mounted between the sides of the pressure arms. After the die is filled with the molding composition the cams force the male die down upon the female die. The mold then passes between the aforementioned rolls 414 and 416, which are located so that one is above and the other is below the same mold at the same time. The male die closing cam is cut away to admit the roller 416, as shown at 460 in Fig. 7. The female die is fixed to the rotating table and does not require separate support during the molding operation so that the lower pressure roll 414 therefore simply supports the under side of the rotating table at the point 418 (Figs. 1 and 6). The male die is not fixed to the rotating table but reciprocates in a hub or boss on the skirt of the rotating table. In order to force it against the female die with sufficient force to completely close the mold the upper pressure wheel 416 bears on the mushroom head 336 of the male die pressure spindle 317 (Fig. 3). This forces the pressure spindle against the pressure spindle sleeve 315, to which the male die block 306 is secured, and as a result the die is properly closed, excess molding composition cut off and squeezed away, and the molding operation carried out. The pressure with which the wheels 416 and 414 close the die is regulated by an adjustable pressure arm spring tensioning device which connects the upper and lower pressure arms. This device comprises a turnbuckle 419 with its accompanying eye bolts 420 and 421, the eye bolts also carrying locknuts 422 and 423. The eye of the eye bolt 421 is secured to the upper pressure arm (between the bars of which it is made) by means of a bolt 424, and the pressure arm spring 425 is hooked through the eye in eye bolt 420. The other end of this spring encircles a bolt 426 secured to the lower pressure arm. The tensioning device is enclosed in a circular pipe-like housing 427, about one end of which there is threaded an adjustable sleeve 428. The upper end of the housing 427 bears against the apertured plate 429, which may be secured to the upper pressure arm. A similar bearing plate 430, located at the lower end of the tensioning device may be secured to the lower pressure arm by means of screws 431. The tension in the spring and consequently the molding pressure can be regulated by setting the turnbuckle. The turnbuckle spring assembly is maintained in position and protected by its surrounding sheath comprising parts 427 and 428. By means of the adjustable sleeve 428 the sheath can be set at the proper length to correspond with the adjustment of the turnbuckle and other parts of the spring tensioning means. The parts 427, 428, 429 and 430 also serve to keep the upper and lower pressure arms properly spaced. Access to the turnbuckle 419 is possible through an opening 432 in the sleeve part 427. It is possible to insert a wrench through this opening and with the same turn the turnbuckle.

*The cams*

The male die is caused to move to and away from the female die by means of cams which operate on opposite sides of its mushroom head 336, the cams being shown in dot and dash outline in Fig. 2. The inside cam, which by acting on the under surface of the mushroom head 336 forces the male die outward, is indicated at 451 in Fig. 3, and the outside cam which contacts the face or top of the mushroom head of the pressure spindle on the male die, is indicated at 452 in Fig. 3. The ejecting plunger of the female die, as indicated elsewhere, is movable toward and away from the male die for the purpose of forcing the molded and cooled target out of the female die. The motion of the said ejecting plunger is controlled by cams operating on the inner and outer surfaces of its somewhat mushroom-like head 337. If desired the head may be made L-shaped so that the pull down may be accomplished by a force acting at or near the axis of the shaft-like stem. The cam 453 operates on the outer surface of the mushroom head, and the cam 454 operates on the inner or under side thereof.

Figure 7:
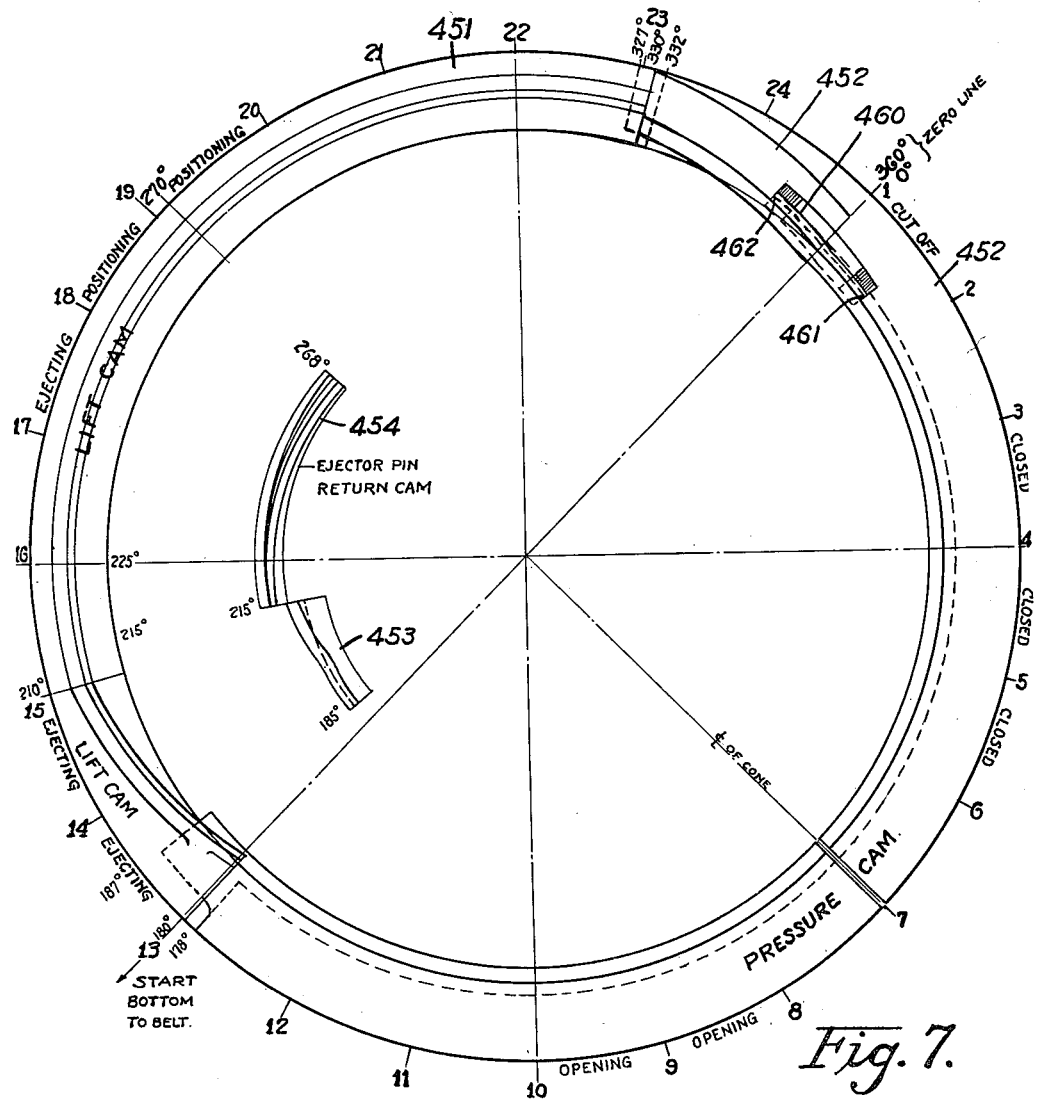
Fig. 7 is a diagram illustrating the cycle of operations of the machine and showing somewhat diagrammatically the cams which open and close the dies as well as the cams which eject the targets from the dies.
Figure 8:
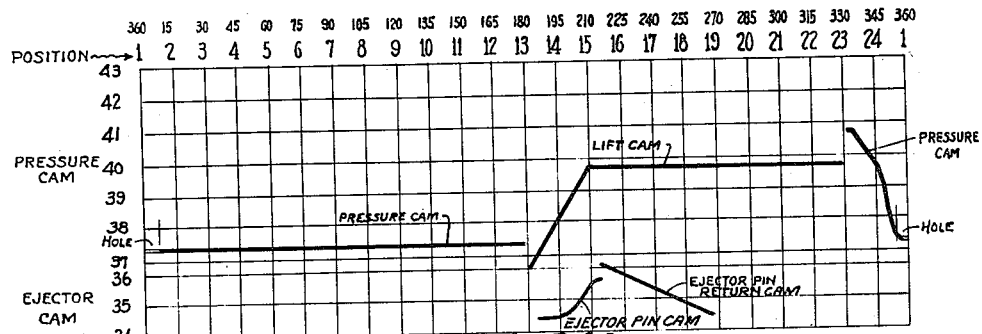
Fig. 8 is a cam diagram in conventional form showing the time and position relation of the various dies at the various locations during the rotation of the molding table.

Cams 451, 452, 453 and 454 are best shown diagrammatically in Fig. 7, and a cam diagram is shown in Fig. 8.

Referring now to Fig. 7, the path traveled by any individual mold on the rotating table is divided into 24 positions. At position 1 there is no cam action because the die assembly, the female die of which has been filled with fluid molding composition, is being closed by the pressure wheels 416 and 414. The pressure cam 452, as previously indicated, is cut away as indicated at 460 adjacent this position to permit the pressure wheel 416 to act on the mushroom head 336 of the pressure spindle 317. With the travel of the rotating table a given die, which has been closed by the aforementioned pressure wheels 414 and 416, passes the edge 461 of the slot 460 in the pressure cam 452, and the mushroom head 336 contacts the surface of said cam 452. The cam maintains the mold closed as it passes through positions 2, 3, 4, 5, 6, 7, 8, 9, 10, 11, 12 and 13. Immediately after the mold passes position 13 (Fig. 8), the lift cam 451 comes into action to move the pressure spindle outward, thereby lifting the male die from the female die to release the molded target. The operating surface of the pressure cam 452 at the same time is shaped and cut away to permit the outward movement of the mushroom head 336. The male die continues to be retracted through positions 13 and 14 to its outermost position, which it reaches shortly after leaving the position 14. With the opening of the die assembly, the molded target should drop on to the conveyor belt to be carried away from the molding machine. It sometimes happens that the shrinking of the molded target causes it to grip the male die and stick thereto. To prevent any such action one segment of the male die molding surface rim is separate and mounted upon an arm 335, as previously described. The arm 335 is of such length that the stripper finger 334 cannot retract as far as the male die retracts when the male die is withdrawn by the lift cam 451. The flange 205 is drilled at 455 to receive a clevis pin or headed bolt-like piece 456. When in operative position the head of this pin is on the outside of the flange and the stem projects beyond the inner surface thereof to serve as the contact point for the end of the arm 335. The bolt 456 is held in position by a strap 457 loosely bolted by means of a bolt 458 to the outer surface of the flange 205. The loose connection is obtained by making the hole in the strap 457 through which the bolt 458 extends slightly larger than the diameter of the bolt. A thumb screw 459 extends through the central portion of the strap 457, and is screwed into the flange 205. A pressure spring between the head of the screw 459 and the outer surface of the strap 457 presses against the strap 457 with sufficient pressure so that it acts as a lever to maintain the pin 456 in proper position (Fig. 3). Retraction of the male die causes the pin 456 to yieldingly stop the withdrawal movement of the stripper finger, and as a result, the finger forces any sticking target away from the remainder of the male die molding surface as such surface continues to retract.

Although the normal contraction of the cooling molded target tends to cause it to free itself from the female die, it sometimes happens that a target sticks in this section of the mold, and for this reason positive ejection means have been provided. The ejection plunger 333 is moved toward the male die as the male die recedes during the opening of the mold, and as a result the molded target cannot remain in the female die. The ejecting action is brought about by the ejector pin pressure cam 453, which begins its action on the mushroom head 337 of the ejector pin shortly after, that is, between positions 13 and 14, the lift cam 451 starts to raise the male die from the female die. The acting time of this cam is short, and it disengages the ejecting plunger between positions 14 and 15. Immediately after this disengagement the ejecting pin return cam engages the underside of the mushroom head 337 on the ejecting plunger, and gradually (i. e., as the mold passes through positions 15, 16, 17 and 18) returns the ejector pin face back to its normal position in the female die.

The pressure cam 452 disengages the pressure spindle shortly before the mold reaches position 13 and does not resume engagement therewith until after the mold has passed position 22. In the meantime the lift cam which has been raising the male die from the female die during the passage through positions 13 and 14 maintains the male die in its retracted position during its passage through positions 15, 16, 17, 18, 19, 20, 21 and 22. The mold, which is open during its passage through positions 19, 20, 21 and 22, passes the spout of the molding composition feed pump between positions 23 and 24 to receive the moldable charge. Shortly after passing position 22 the lift cam disengages the pressure spindle and the closing of the mold begins because the pressure cam again engages the pressure spindle. It continues to force the male die against the charge in the female die through position 23 almost up to position 24, where the cam is cut away at 462 to permit the pressure wheel 416 to act on the mushroom head 336 of the pressure spindle. The die is then closed with molding pressure and the excess molding material forced out of the die assembly by the action of the wheels 414 and 416, as previously described.

While the action of only one die has been described, it will be appreciated that each of the 24 dies on the rotating table goes through the same cycle of action during one complete rotation. The cams are supported on the frame either directly or by means of straps, as indicated in the drawings.

The relative distances of the cam surfaces from the apex of the cone in which the axes of the dies move is indicated by the numerals 34, 35, 36, 37, 38, 39, 40, 41, 42 and 43 on the coordinate lines in Fig. 8.

Fig. 7 is a view looking downwardly upon the rotating carrier along the axis of shaft 57 (Fig. 1). The pressure cam, for example, is operating upon the plunger of the male die. The axis of movement of the plunger of this die is inclined to the plane shown in Fig. 7 and slants inwardly and downwardly to the center of the axis of shaft 57 prolonged downwardly. For this reason, therefore, as the pressure cam surface 452 is moved inwardly towards the center, the plunger of the male die will be moved downwardly. This holds true for the operation governed by the other cams shown in Fig. 7. In Fig. 8, it it to be noted that there is a difference in the distance from the apex of the cone to the pressure cam and to the lift cam, both as indicated at station 13 and station 23. This is due to the fact that the pressure cam works on one side of the plunger 336 of the male die or the outer surface of the plunger 336 of the male die, and the lift cam operates on the under surface thereof; similarly for the ejector pin return cam and the ejector pin cam, wherein the ejector pin cam works on the inner surface of the plunger of the female die and the ejector pin return cam operates on the outer surface.

The cooling system

As indicated elsewhere, the molding composition is at an elevated temperature when placed in the molds. In order to quickly cool the molded target, circulating cooling water is supplied to both the male die and female die portions of the die assembly. The water is piped to a swivel connection 220 (Fig. 1) mounted on the carrier shaft 57, and the moving part revolves with the rotating table. The water passes through swivel connection 220 to supplying manifold 221 of header 222, comprising separated supplying and receiving manifolds. The heater is also mounted on the hollow table shaft 57, the shaft extending from the worm gear unit housing. Water passes from the supplying manifold 221 to the individual die assemblies, where it performs its cooling function. The warm water from the cooled dies returns to the receiving manifold 223, and from there is discharged through the said hollow portion of the table-shaft.

In the embodiment of the invention illustrated in the drawings, there are 24 dies located at regular intervals on a rotating table. The female die portions of the die assemblies, which constitute the bottom thereof, are fixed to the table. The male die or top portion of the dies are mounted to reciprocate to and from the fixed-position female die portion. The cooling of the two types of dies, therefore, presents different problems. Since the female dies are fixed, metal pipes bent into the desired shape with unions can be used for conducting the water from one mold to another. The male dies are not in fixed position, so that flexible connecting water lines are necessary to perform an equivalent function.

Figure 4:
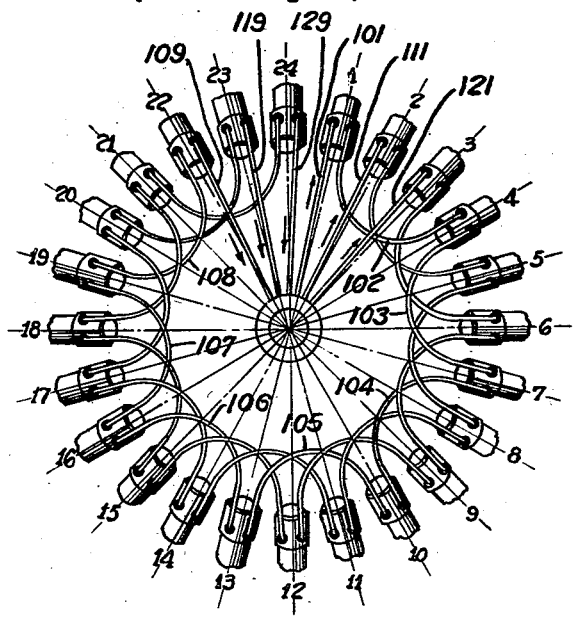
Fig. 4 is a diagrammatic plan view of the cooling system for the male dies.

It is preferred to cool 8 die sections with the same cooling water, both in the case of the male and female dies. Referring to Fig. 4 wherein there is disclosed somewhat diagrammatically the cooling arrangement for the male dies, it will be seen that the cooling water leaves the supplying manifold through the flexible hose 101 and passes therethrough to the male die in position No. 1. The water circulates through this die and passes therefrom through flexible line 102 to the male die in position No. 4. After exercising its cooling function in this die, it passes through line 102 to the male die in position No. 7 which it cools, and then passes through the flexible connection 104 to the male die in position No. 10. As will be apparent from this description, the cooling water skips two male dies in its travel. This is an important matter, since by passing over two molds the bend in the flexible hose is not nearly so sharp as would be necessary of the cooling water passed to the adjacent die. Since the male dies are in substantially constant motion, a sharp bend would cause very rapid and uneconomical destruction of the connections. The cooling water passes from the male die in position 10, through the flexible connection 105 to the male die in position 13, through the flexible connection 106, to the male die in position 16, through the flexible connection 107 to the male die in position 19, through the flexible connection 108 to the male die in position 22, and then out through the flexible connection 109 to the receiving manifold of the header from which it is discharged from the machine after having cooled 8 male dies, namely, those in positions 1, 4, 7, 10, 13, 16, 19 and 22. A second flexible connection 111 similar to 101 leaves the supplying manifold carrying fresh cooling water, which water cools, in the manner previously described, the male dies in positions 2, 5, 8, 11, 14, 17, 20 and 23. After having completed its cooling function, it leaves the male die in position 23, passes through the exit line 119, and is discharged through the central portion of the table shaft. The remaining series of male dies, namely, those in positions 3, 6, 9, 12, 15, 18, 21 and 24, are similarly cooled by water which leaves the supplying manifold through the flexible connection 121, made of rubber or the like, ordinary garden hose being satisfactory. Water is discharged from the male die in position 24, through the flexible outlet 129 to the receiving manifold of the header, from whence it is conducted away from the machine. For the sake of clearness only one complete set of cooling lines is referred to.

Figure 5:
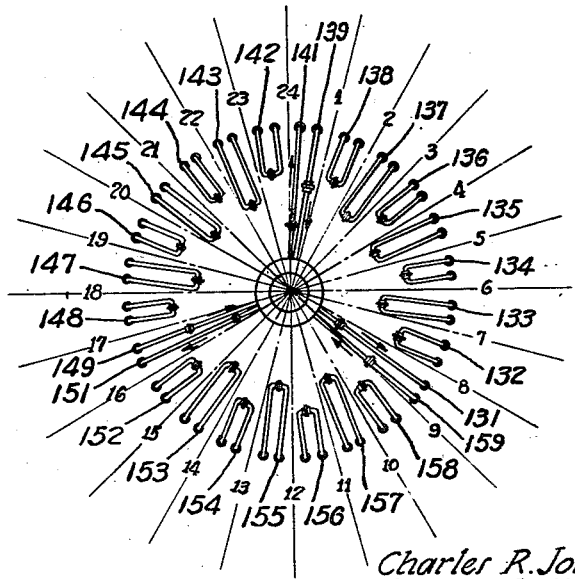
Fig. 5 is a diagrammatic plan view of the cooling system for the female dies.

The cooling of the female dies is much simpler, since, as indicated above, rigid water conduits can be employed. The cooling arrangement for these dies is shown in Fig. 5, where the numeral 131 represents a pipe carrying water from the supplying manifold to one side of the female die in position 8. The water after circulating through this mold leaves by connecting line 132 and enters one side of the female die in position 7. The course of the water thereafter is through the female die in position 7 through the line 133, through the female die in position 6, through the line 134, through the female die in position 5, through the line 135, through the female die in position 4, through the line 136, through the female die in position 3, through the line 137, through the female die in position 2, through the line 138, through the female die in position 1, and then through the exit line 139 to the receiving manifold of the header. In the second female die cooling series, the cooling water leaves the supplying manifold through line 141 and circulates through the female dies 24, 23, 22, 21, 20, 19, 18 and 17, after which it passes to the receiving manifold through line 149. In this series the connecting lines 142, 143, 144, 145, 146, 147 and 148 are used.

In the third series the cooling water leaves the supplying manifold through the line 151, traveling to the female die in position 16 and thence through the female dies in positions 15, 14, 13, 12, 11, 10 and 9, after which it returns to the header through the line 159. In this series the connecting lines 152, 153, 154, 155, 156, 157 and 158 are used. The connecting pipes in the female die cooling system are rigid; unions are conveniently used for making intermediate connections, and are indicated in Fig. 5.

It has been found convenient to stagger female and male die cooling system exits and adits, and the best arrangement so far tried is described above. Upon consideration it will be seen that the coldest female dies are 8, 16 and 24, and that the coldest male dies are 1, 2 and 3. The warmest female dies are 1, 9 and 17, and the warmest male dies are 22, 23 and 24. This staggering of the coldest and hottest dies of the male and female series causes the temperatures of the complete molds to be more nearly uniform than would be the case if the cooling water as it left the supplying header entered the male and female die of the same mold. Some of the connecting lines, such as 132, 134, 136 and 138, are shown in the drawings as being shorter than other connecting lines such as 133, 135 and 137. This difference is necessary because the alternate connecting lines must bridge over flange supporting spokes in the rotating table upon which the female dies are mounted.

It will be appreciated that the above description of the cooling system has been made with the rotating carrier in a given position so that the position of the female die in Fig. 5 is the same as that of the male die in Fig. 4. As a result, comparison of the arrangement of the cooling lines is facilitated.

The feeding mechanism

In the preferred embodiment, a tank (Fig. 9) carries several hours' supply of molding composition. Gas burners under this tank keep the material in molten condition. The usual practice is to prepare a batch of molding composition, which frequently includes previously molded material such as broken targets, scrap, flash and the like, melt it and run into the tank 917. A metering pump 918 (Figs. 2 and 9) withdraws the fluid composition and forces it out of the spout 919 (Figs. 1, 2 and 9) over the path of the female dies. The delivery may be in the form of either a continuous or pulsating stream. A continuous stream seems to be the best mode of operation. The female dies come under the spout at about position 23 (Figs. 7 and 8) in their travel.

The metering pump is preferably of the well-known gear type. It is desirable to nitride the contact surfaces thereof to minimize wear. The pump, like the tank, is heated with a gas burner during operation, as it is especially desirable to heat the pump continuously.

The belt conveyor

The belt conveyor 79 (Fig. 2) is of conventional design. Sheet metal or like chutes may, when desired, be used to guide the ejected targets from the molds into position on the belt. When such chutes are used the cooling water, or other fluid, may conveniently be applied therein by means of sprays, thus expediting the cooling of the targets.

Miscellaneous

It has been found convenient to lubricate the moving parts on the rotating table with a pressure oiling system. The various lubricating devices throughout the machine may be of conventional design. In the interest of brevity and clearness they have not been shown in the drawings or described in the specification.

It will be appreciated by those skilled in the art that the inventive features described herein can be used for the molding of articles other than fixed targets.

In the interest of safety the machine may be encased in perforated metal or woven wire screen panels.

With suitable alteration in the size of the rotating table, different speeds of rotation, different cooling conditions, and the like, the number of dies may be increased or decreased and yet give the same output of targets. Speeds of rotation resulting in the molding of 50 to 100 targets per minute give especially desirable operation characteristics for a 24 mold machine.

The shaft upon which the table rotates can be designed for any desired angle, provided the axes of the molds are aligned in the surface of a cone of rotation which brings the female molds into an upright position for filling. The most desirable shaft angle is 45° because the target being ejected drops free from both dies in such an arrangement.

It will be apparent that the complete machine comprises many parts and performs many functions, any of which might be performed separately or in conjunction with mechanisms differing from those herein described. The description and drawings throughout are directed to representative embodiments of the invention susceptible to many modifications, and since many apparently widely different embodiments of the invention may be made without departing from the spirit and scope thereof, it is to be understood that we do not limit ourselves to the specific embodiments thereof except as defined in the appended claims, which claims are to be broadly construed.

What is claimed is:

1. In a continuous molding machine for plastic material, a single rotating carrier with an outside face, said outside face having the configuration of a truncated cone; and cooperating molding dies located on said outside face and carried by said carrier.

2. In a continuous molding machine for plastic material, a single rotating carrier with an outside face, said outside face having the configuration of a truncated cone; cooperating dies located on said outside face and carried by said carrier, the axis of said carrier being inclined so that the molding surfaces of the dies are substantially horizontal at one point of rotation of the carrier.

3. In a continuous molding machine for plastic material, a single rotating carrier with an outside face, said outside face having the configuration of a truncated cone; cooperating dies located on said outside face and carried by said carrier, the axis of said carrier being inclined so that the molding surfaces of the dies are substantially vertical at one point of rotation of the carrier.

4. In a continuous molding machine for plastic material, a single rotating carrier with an outside face, said outside face having the configuration of a truncated cone; cooperating dies located on said outside face and carried by said carrier, the axis of said carrier being inclined so that the molding surfaces of the dies are substantially horizontal at one point and vertical at another point of rotation of the carrier.

5. In a continuous molding machine for plastic material, a single rotating carrier with an outside face, said outside face having the configuration of a truncated cone; a series of cooperating dies, each comprising an upper and lower portion, said cooperating dies being located on said outside face and carried by said carrier; stationary cams cooperating with the dies, rotation of the carrier causing relative movement of the upper and lower portions of the dies.

6. In a machine for continuously molding targets from a plastic material, a continuously rotating carrier with an outside face, said outside face having the configuration of a truncated cone; a series of cooperating dies thereon; feeding means located so as to feed the plastic material continuously into the dies; and means to supply a predetermined amount of the plastic material to the dies.

7. In a machine for continuously molding targets from a plastic material, a continuously rotating carrier with an outside face, said outside face having the configuration of a truncated cone; a series of cooperating dies thereon; feeding means located so as to feed the plastic material continuously into the dies; and a metering pump for supplying a predetermined amount of the plastic material to the dies.

8. In the molding of targets from a thermoplastic material, the method comprising the steps of: feeding the molten thermoplastic material into a female die; closing and continuously maintaining a male die on the molding composition in the female die while moving the axis of the dies through an angle of substantially 90°; continuously cooling both dies; and then removing the cooled target from the dies.

9. In a machine for continuously molding targets from a plastic material, a rotating carrier having a series of two-part molds thereon; resilient means carried by a mold part; stationary cams cooperating with said resilient means whereby rotation of the carrier operates the mold parts; and a pair of opposed rollers for applying molding pressure to the mold parts, said rollers being mounted on pivoted arms held and urged toward each other by a second resilient means.

10. In a continuous molding machine for plastic material, a rotating carrier with an outside face, said outside face having the configuration of a truncated cone; a series of two-part molds located on said outside face; means carried by each mold to move the parts thereof relative to each other; stationary cams cooperating with the moving means to open the mold parts upon rotation of the carrier; and means for feeding the plastic material into one part while said mold parts are open, said cams comprising surfaces effective upon rotation of the carrier to engage the moving means to close the mold parts after the plastic material has been fed thereto.

11. In a machine for continuously molding articles from plastic material: a rotating carrier with an outside face, said face having the configuration of a truncated cone; a series of two-part molds located on said outside face; means carried by each mold to move the parts thereof relative to each other; stationary cams cooperating with the moving means to open and close the mold parts in a predetermined relationship upon rotation of the carrier; means for feeding the plastic material into one part while said mold parts are open, said cams being effective to actuate the moving means to close the mold parts after the plastic material has been fed thereto, and thereafter to open the parts after the material has become sufficiently set; and means to eject the articles from the two-part molds.

12. In a machine for continuously molding articles from plastic material; a rotating carrier with an outside face, said face having the configuration of a truncated cone; a series of two-part molds located on said outside face; means carried by each mold to move the parts thereof relative to each other; an ejecting means carried by one part of each mold; stationary cams cooperating with the moving means and the ejecting means to open and close the mold parts and to operate the ejecting means in a predetermined relationship upon rotation of the carrier; means for feeding the plastic material into one part while said mold parts are open, the cams being effective to actuate the moving means initially to close the mold parts after the plastic material has been fed thereto, thereafter to open the mold parts after the material has become sufficiently set, and subsequently to actuate the ejecting means to remove the molded article.

13. In a machine for continuously molding articles from plastic material; a rotating carrier with an outside face, said face having the configuration of a truncated cone; a series of two-part molds located on said outside face; cooling means for said two-part molds; means carried by each mold to move the parts thereof relative to each other; an ejecting means carried by one part of each mold; stationary cams cooperating with the moving means and the ejecting means to open and close the mold parts and to operate the ejecting means in a predetermined relationship upon rotation of the carrier; means for feeding the plastic material into one part while said mold parts are open, the cams being effective to actuate the moving means initially to close the mold parts after the plastic material has been fed thereto, thereafter to open the mold parts after the material has become sufficiently set, and subsequently to actuate the ejecting means to remove the molded article.

14. In a machine for continuously molding articles from plastic material: a rotating carrier with an outside face having the configuration of a truncated cone; a series of two-part molds located on said outside face; means carried by each mold to move the parts thereof relative to each other; stationary cams cooperating with the moving means to open the mold parts upon rotation of the carrier, the axis of said carrier being inclined so that the molding surfaces of the mold parts are substantially horizontal at one point of rotation of the carrier and substantially vertical at another point of rotation of the carrier; means for feeding the plastic material into one part while its molding surface is in a substantially horizontal position, the cams being effective upon further rotation of the carrier to engage the moving means to close the mold parts after the plastic material has been fed thereto, and thereafter to open the mold parts after further rotation of the carrier; and means to eject the articles from the mold parts when the molding surfaces are substantially in a vertical position.

15. In a machine for continuously molding articles from plastic material: a rotating carrier with an outside face having the configuration of a truncated cone; a series of two-part molds located on said outside face; a conveyor; means carried by each mold to move the parts thereof relative to each other; stationary cams cooperating with the moving means to open the mold parts upon rotation of the carrier, the axis of said carrier being inclined so that the molding surfaces of the mold parts are substantially horizontal at one point of rotation of the carrier and substantially vertical at another point of rotation of the carrier; means for feeding the plastic material into one part while its molding surface is in a substantially horizontal position, the cams being effective upon further rotation of the carrier to engage the moving means to close the mold parts after the plastic material has been fed thereto, and thereafter to open the mold parts as they approach a vertical position; and means to eject the articles from the open, substantially vertical, molding surfaces of the mold parts on to the conveyor.

16. In a continuous molding machine for plastic material, a rotating carrier with an outside face, said outside face having the configuration of a truncated cone; a series of two-part molds mounted on said face, the mold parts being movable rectilinearly relative to each other on an axis substantially perpendicular to said face, each part having a fluid-cooled chamber; a hollow shaft for said carrier; and means on said hollow shaft to supply a cooling fluid from the shaft to the chambers of the mold parts.

17. In a continuous molding machine for plastic material, a rotating carrier with an outside face, said outside face having the configuration of a truncated cone; a series of two-part molds mounted on said face, the mold parts being movable rectilinearly relative to each other on an axis substantially perpendicular to said face, each part having a fluid-cooled chamber; a hollow shaft for said carrier; and means comprising a manifold on said hollow shaft to supply a cooling fluid from the shaft to the chambers of the mold parts, and a second manifold on said shaft to receive the fluid from the chambered parts and convey it to the hollow shaft.

18. In a continuous molding machine for plastic material, a rotating carrier with an outside face, said outside face having the configuration of a truncated cone; a series of two-part molds mounted thereon comprising upper and lower parts, the mold parts being movable relative to each other and each part having a fluid-cooled chamber; a hollow shaft for said carrier having fluid exits and adits; a cooling system for the upper parts of the two-part molds comprising tubular connections from said exits to the upper mold parts and from the upper mold parts to said adits; and a second cooling system independent of the first cooling system for cooling the lower parts of the two-part molds.

19. In a continuous molding machine for plastic material, a rotating carrier with an outside face, said outside face having the configuration of a truncated cone; a series of two-part molds mounted thereon comprising upper and lower parts, the mold parts being movable relative to each other and each part having a fluid-cooled chamber; a hollow shaft for said carrier having fluid exits and adits; a cooling system for the upper parts of the two-part molds comprising tubular connections from said exits to the upper mold parts and from the upper mold parts to said adits; and a second cooling system independent of the first cooling system for cooling the lower parts of the two-part molds, said second cooling system comprising tubular connections from said exits to the lower mold parts and from the lower mold parts to the adits, the exits and adits of said first cooling system being staggered relative to the exits and adits of said second cooling system.

CHARLES R. JOHNSON.
STANLEY L. HANDFORTH.
ROYAL E. SMITH.

CERTIFICATE OF CORRECTION.

Patent No. 2,300,290.  October 27, 1942.

CHARLES R. JOHNSON, ET AL.

It is hereby certified that error appears in the printed specification of the above numbered patent requiring correction as follows: Page 4, second column, line 36, strike out "on the lower pressure"; and that the said Letters Patent should be read with this correction therein that the same may conform to the record of the case in the Patent Office.

Signed and sealed this 12th day of January, A. D. 1943.

(Seal)

Henry Van Arsdale,
Acting Commissioner of Patents.